United States Patent [19]

Esterling et al.

[11] Patent Number: 4,528,675

[45] Date of Patent: Jul. 9, 1985

[54] FSK MODEM FOR BIDIRECTIONAL LOOP COMMUNICATIONS SYSTEM

[75] Inventors: Robert J. Esterling, Horsham; Clarence L. Freed, Harleysville; Edward L. Weiss, Milford Township, Pike County all of Pa.; Simon Kofowitz, Sharon, Mass.

[73] Assignee: General Signal Corporation, Stamford, Conn.

[21] Appl. No.: 528,357

[22] Filed: Aug. 31, 1983

[51] Int. Cl.³ .......................... H03C 3/00; H03D 3/00; H04B 1/38
[52] U.S. Cl. .......................................... 375/9; 375/45; 375/88; 329/126; 340/825.48; 370/88
[58] Field of Search .................... 375/45, 107, 80, 88, 375/9; 340/825.71, 825.48, 825.73; 332/16 R; 329/126, 128, 136, 110; 370/88

[56] References Cited

U.S. PATENT DOCUMENTS

| | | | |
|---|---|---|---|
| 3,876,983 | 4/1975 | Zafiropulo et al. | 375/107 |
| 3,930,121 | 12/1975 | Mathieson | 375/62 |
| 4,311,964 | 1/1982 | Boykin | 375/83 |
| 4,320,522 | 3/1982 | Hayes | 375/89 |
| 4,403,212 | 9/1983 | Masaki | 455/38 |

Primary Examiner—Marc E. Bookbinder
Assistant Examiner—Raymond C. Glenny
Attorney, Agent, or Firm—W. G. Miller, Jr.; Harold Huberfeld

[57] ABSTRACT

A modem which utilizes a method and means for coding a data signal for transmission and reception which includes the steps of generating a prefix signal which is a train of pulses at a multiple or submultiple of a selected baseband frequency, then generating a data stream following said prefix with the data stream having one binary state transmitted at said baseband frequency and the other transmitted at another frequency. The data stream is terminated with a suffix having a waveform different from that of the two binary states. A separate receiver is provided for each of the redundant highways. The receivers utilize a clock circuit synchronized to the data and a timer responsive to the clock for establishing the bit time. The incoming signal is modified by a factor so that a single decoding circuit can be used to decode the prefix as well as the data. A prefix counter counts the initial incoming pulses and upon receiving the number in a prefix indicates to the circuit that a carrier has been detected. A synch period which follows the prefix is detected as an additional indication that the prefix is finished and data is next. The first carrier received from the redundant highways is selected based upon completion of the prefix count and the detection of a synch period. Once the synch period is detected a bypass circuit is utilized to bypass the modifying circuit so that the incoming signals go directly to the decoding circuit without modification. A bad-bit circuit is provided to prevent passing on to the station any bad bits. Likewise a dead-line timing circuit is provided to reset the receivers after a predetermined time period has elapsed without a carrier being detected.

5 Claims, 18 Drawing Figures

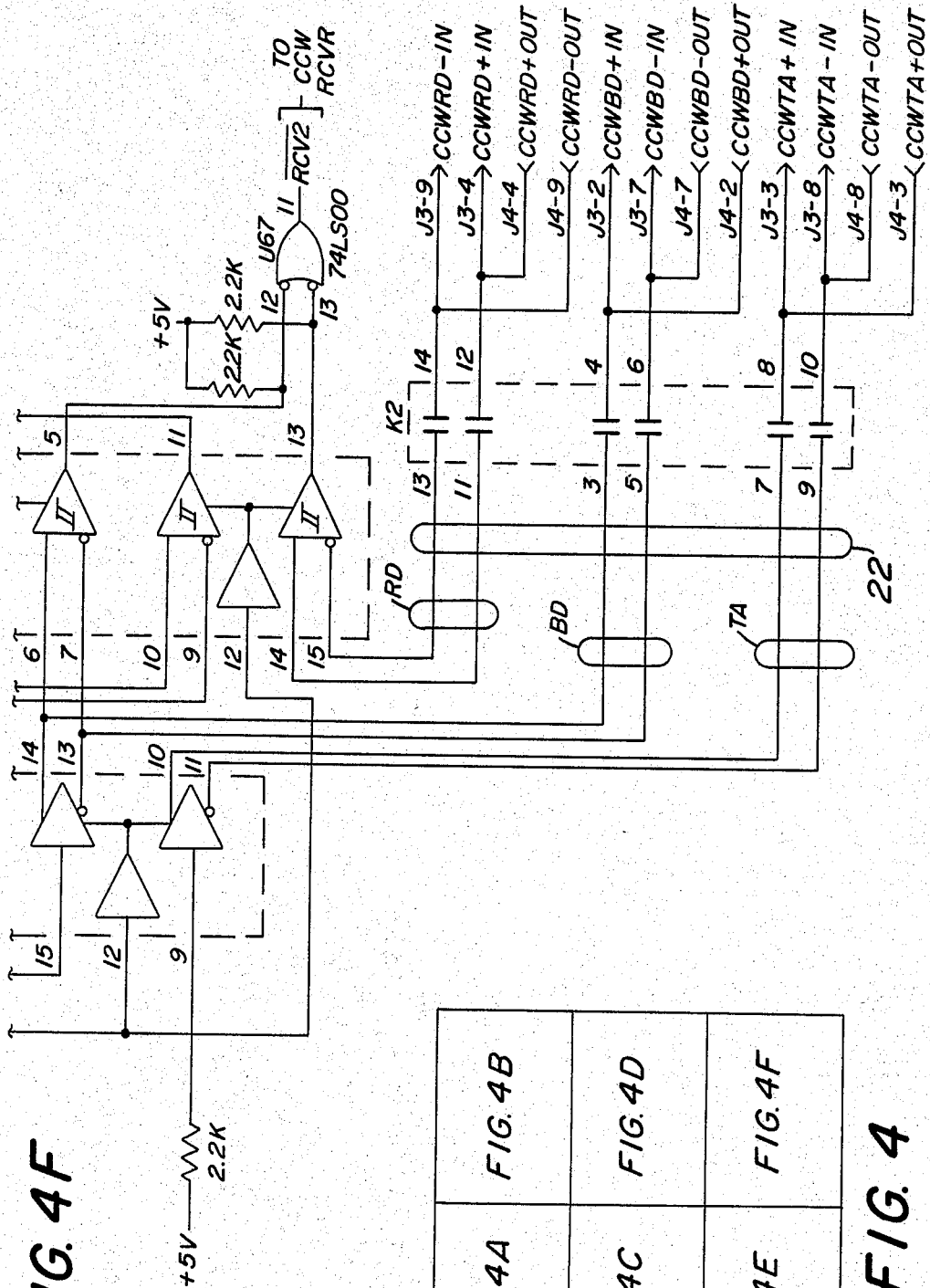

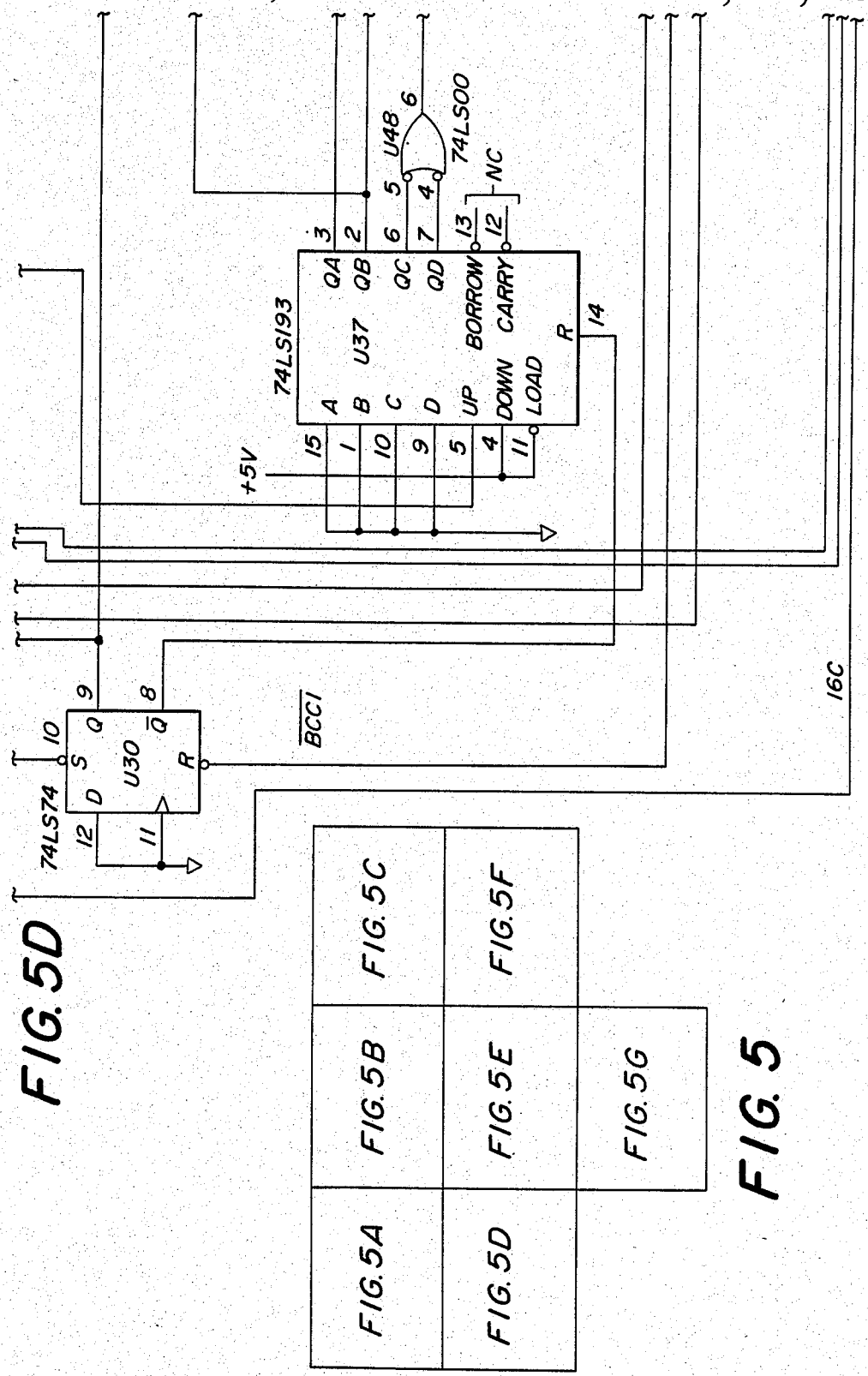

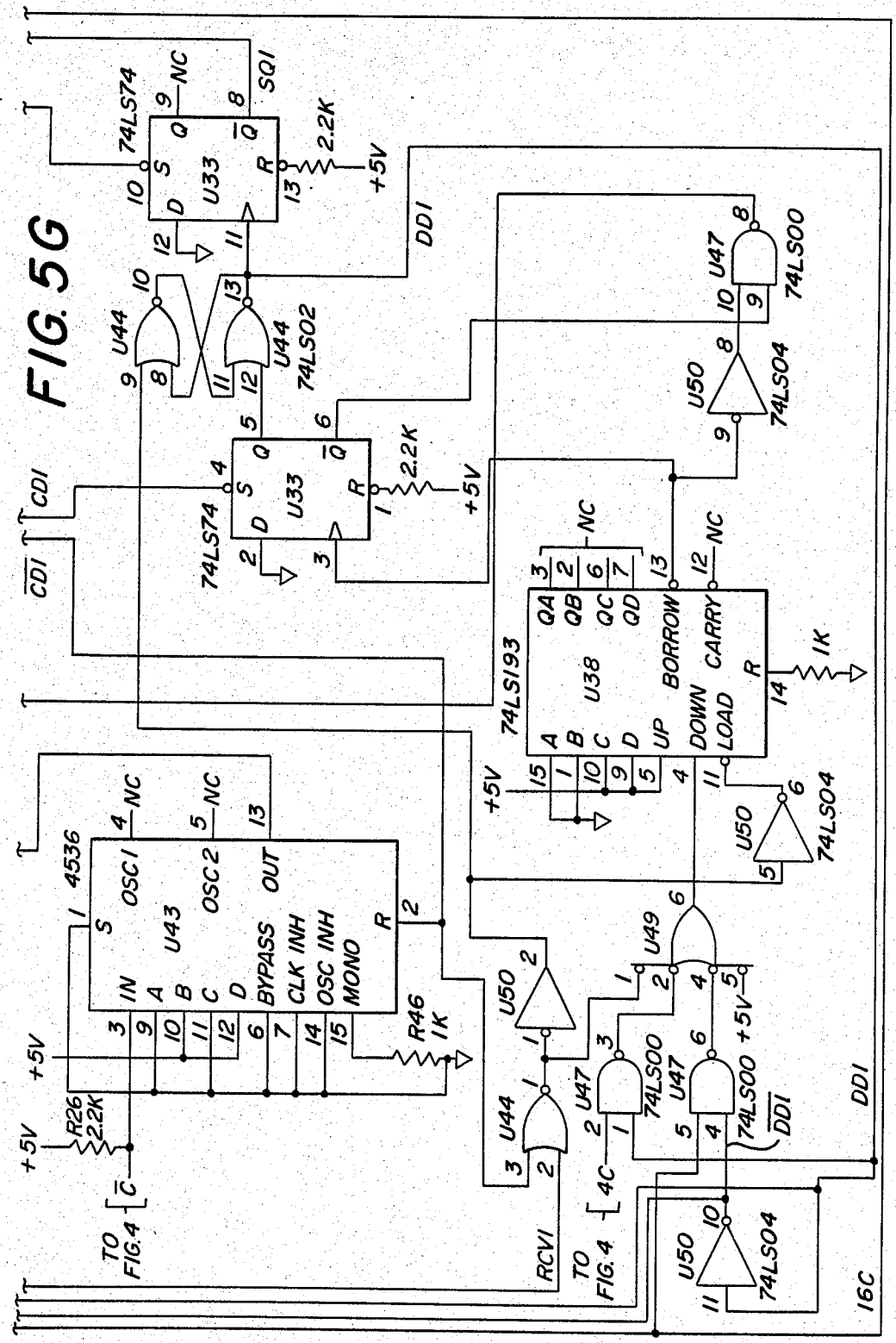

FSK MODEM FOR BIDIRECTIONAL LOOP COMMUNICATIONS SYSTEM

BACKGROUND OF THE INVENTION

The present invention relates to data communications systems such as those used in communicating data over a system utilizing a bidirectional loop as a global highway having nodes for interconnecting to local data highways which in turn interconnect local stations. More particularly this invention relates to methods and means for providing a modem for transmitting and receiving at a local station the signals flowing over the bidirectional loop and the local highway.

In complex data communications systems, such as those utilized in distributed control systems for large industrial plants, there is a necessity for the grouping of stations such as controller stations on local data highways with another global highway interconnecting the local highways in order to minimize the connecting cables and hence the cost of the system. It is also important that the system be as fault tolerant as possible while supporting a large number of stations spread over a large geographical area. One arrangement which has been found to provide fault tolerance under such conditions involves the use of a bidirectional fibre optic loop as the global highway with wire cabling for the local highways each of which connects to the global highway at a node providing the conversion between optical and electrical signals.

The transmission and reception at the local stations in such a system introduces a number of problems, particularly in connection with the bidirectional global highway since each station will normally be receiving two signals from opposite directions at substantially the same time. Thus, the modem which handles the transmission and reception at each of the stations on the local highway must be able to lock onto one of the received signals. In addition, of course, the modem must be able to ignore noise signals and preferably should not include signal mixing, switching, or splitting devices. The present invention provides a novel modem which provides an improved method of coding data for transmission on a complex communications network such as that described above for the purpose of overcoming the problems mentioned above.

SUMMARY OF THE INVENTION

In accordance with the present invention there is provided a novel modem which utilizes a method and means for coding a data signal for transmission and reception which includes the steps of generating a prefix signal which is a train of pulses at a multiple or submultiple of a selected baseband frequency, then generating a data stream following said prefix with the data stream having one binary state transmitted at said baseband frequency and the other transmitted at another frequency. The data stream is terminated with a suffix having a waveform different from that of the two binary states. A separate receiver is provided for each of the redundant highways. The receivers utilize a clock circuit synchronized to the data and a timer responsive to the clock for establishing the bit time. The incoming signal is modified by a factor so that a single decoding circuit can be used to decode the prefix as well as the data. A prefix counter counts the initial incoming pulses and upon receiving the number in a prefix indicates to the circuit that a carrier has been detected. A synch period which follows the prefix is detected as an additional indication that the prefix is finished and data is next. The first carrier received from the redundant highways is selected based upon completion of the prefix count and the detection of a synch period. Once the synch period is detected a bypass circuit is utilized to bypass the modifying circuit so that the incoming signals go directly to the decoding circuit without modification. A bad-bit circuit is provided to prevent passing on to the station any bad bits. Likewise a dead-line timing circuit is provided to reset the receivers after a predetermined time period has elapsed without a carrier being detected.

DETAILED DESCRIPTION OF THE PREFERRED EMBODIMENT

Figure 1:
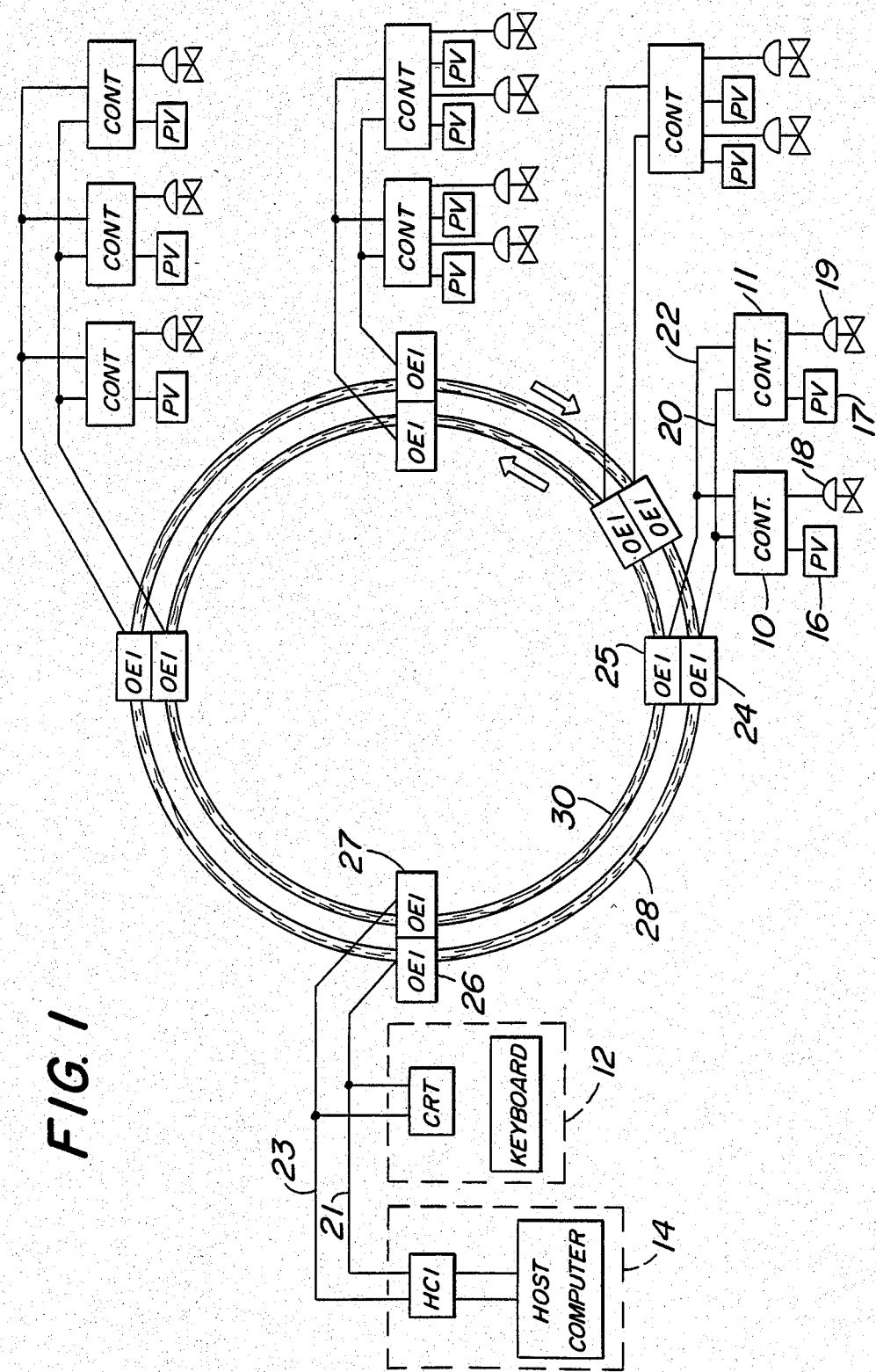
FIG. 1 illustrates a distributed process control system of the type for which this invention is useful.

In FIG. 1 there is illustrated a communications system such as can be used in a distributed process control system utilizing the present invention. This communications system is shown as including a number of stations such as the controller stations 10 and 11, the operator station 12, and a host computer station 14. The controller stations are shown as receiving inputs relating to the magnitude of process variables PV from measuring units such as 16 and 17, and producing a control signal to associated control valves such as 18 and 19 for the control of the loops of the process.

The controller stations are shown in groups which are interconnected by a redundant multi-drop type electrical data network made up of a pair of cables such as 20 and 22. These local data highways or networks are each connected to a corresponding node, such as nodes 24, 25, 26, and 27, of the dual simplex optical repeater ring making up the global data highway, shown as fiber optic cables 28 and 30. The nodes of the global highway are each an Optical-Electrical Interface (OEI) which couples the local electrical network cables such as 20, 21, 22, and 23, with the global fiber optical cables 28 and 30.

As shown in FIG. 1, the optical data highways 28 and 30 are arranged so that the transmitters of the OEIs carry data in opposite directions around the individual rings which can be conveniently referred to as "clockwise" and "counterclockwise" rings. In the same sense the cables 20 and 22 can be referred to as "clockwise" and "counterclockwise".

In the event that there is an interruption in either of the rings as by the inoperability of an OEI transmitter, then communication is provided by the other ring. Also, in the event that both optical cables are broken in the same location, there is still continuity of communication.

The operator's station 12 and host computer station 14 are connected to the global highways by a pair of local data network cables 21 and 23 and repeater nodes 26 and 27. The operator's station will normally include a cathode ray tube monitor and a keyboard input with the appropiate microprocessor and associated elements to provide for interfacing an operator with the system for monitoring and other operating functions. The operator's station will also frequently include a printer and disc file.

The host computer is shown connected to a local data network by the host computer interface HCI. The host computer can, of course, be used for a number of calculating and controller functions as well as for the collection of data.

With communications systems such as that shown in FIG. 1 each of the control stations would typically be able to communicate with the host computer or with the operator station as well as with another control station. Likewise, the host computer and the operators station can communicate with the control stations or between themselves.

The global data highway system of FIG. 1 may typically be a high speed, high data rate, real time communications network. It may, for example, be designed to operate with 31 nodes in the global optical highway, spanning distances on the order of 20,000 ft. with a maximum of 7,000 ft. between adjacent optical-electrical interface nodes. The local networks connected to the nodes may, for example, connect between stations over a distance of 200 feet. Data may be tramsmitted from this network at rates on the order of 500,000 bits per second.

Figure 2:
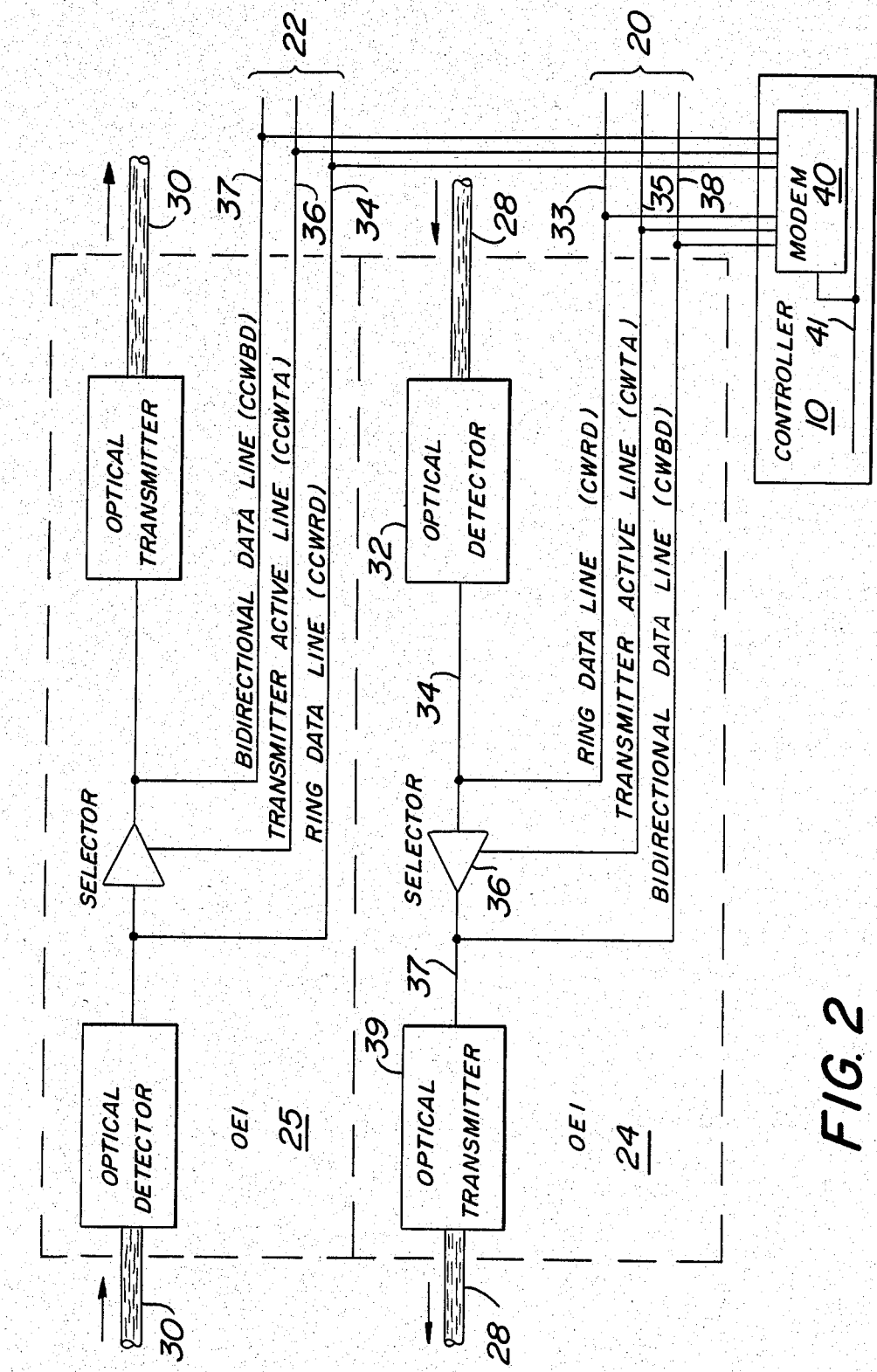
FIG. 2 illustrates an optical-electical interface of the type which can be used in the arrangement of FIG. 1.

FIG. 2 shows in more detail one form for the Optical-Electrical Interfaces such as 24 and 25. These units each have one transmitter-receiver combination. Each transmitter-receiver combination converts optical data from the ring to an electrical form and back again to the optical form for retransmission. Thus, the optical detector 32 is a receiver which receives data from the fiber optic highway 28 in the clockwise direction and converts it to electrical data on line 34. If none of the stations 10 and 11 connected to the local network lines 20 and 22 is transmitting, then the signal received by 32 passes through selector 36 to line 37 for retransmission by optical transmitter 39 over optical fiber 28 to the next Optical-Electrical interface 26 and so on around the global highway ring. This continues until the signal arrives at an Optical-Electrical Interface which is connected to a local data network having a station which is transmitting. To prevent the formation of an endless loop in the global highway that Optical-Electrical Interface having a transmitting station connected to its local highway is conditioned by a signal on the transmitter active line so as not to retransmit the received signal.

Each of the two cables 20 and 22 contains three twisted, shielded pairs, each of which is a balanced multipoint interconnection. Each station in the system such as station 10 contains a modem such as 40 which can advantageously be constructed to have two receiver circuits and a common transmitter circuit for communicating between the data bus 41 of the station and the data highways interconnecting the stations. The receiver circuits can be termed "clock-wise" and "counterclockwise" and, along with the associated transmitter can be connected to their respective cables 20 and 22.

The modem to be described as one form useful in the present invention is usually in the receive mode and works on a "first in" principle whereby it locks onto the first cable which produces an acceptable carrier. When it locks onto a cable it decodes the serial data (message) and provides it, along with the proper timing and handshaking signals, to a microprocessor based communications circuit. This communications circuit interprets and executes the message. It also formats a message to be transmitted and provides it, along with the proper handshaking signals, to the modem.

The three twisted pairs in each of the electrical cables are shown in FIG. 2 as the bidirectional data lines 37 and 38, the ring data lines 34 and 33, and the transmitter active lines 36 and 35. The information which is being tapped off the optical ring via the OEIs is always present on the Ring Data (RD) lines. It is also present on the Bidirectional Data (BD) lines unless one of the modems attached to the cable is transmitting. In this case, the transmitting modem will drive the Transmitter Active (TA) lines high (+ line goes high, − line goes low) and put its message on the BD lines. The TA lines going high will cause each OEI to disable its driver and enable its receiver on the BD line. This effectively breaks the repeater action of the OEIs and inserts the transmitting modem into the rings. The modem can transmit into the optical rings and receive its own message, thereby checking continuity of the highway by looking for carrier detect on each of its receiver circuits. Note also that in the system described here the modem is usually listening to the BD line and uses the information on the RD line only when transmitting. This allows the stations on the electrical cable to communicate with each other without depending on the continuity of either optical ring.

Figure 3:
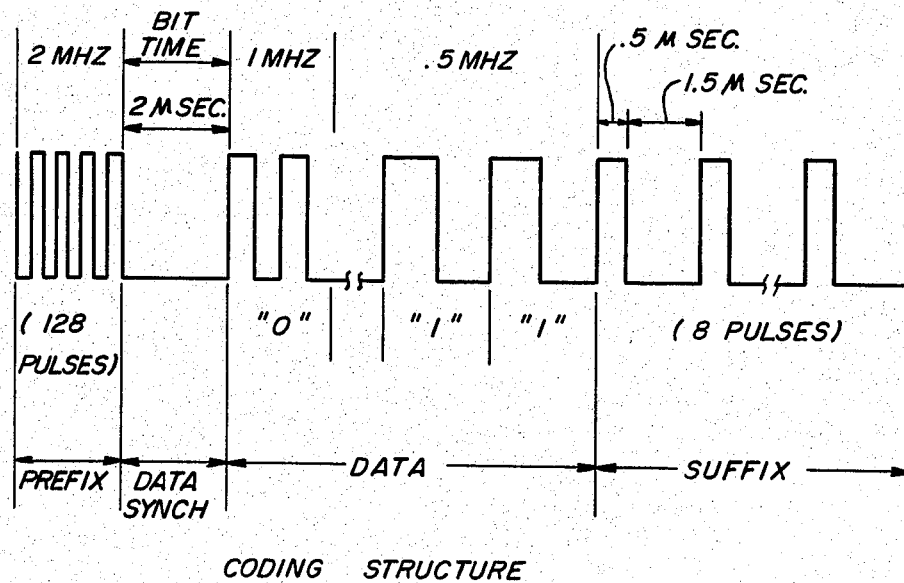
FIG. 3 illustrates the coding structure of this invention.
Figure 4A:
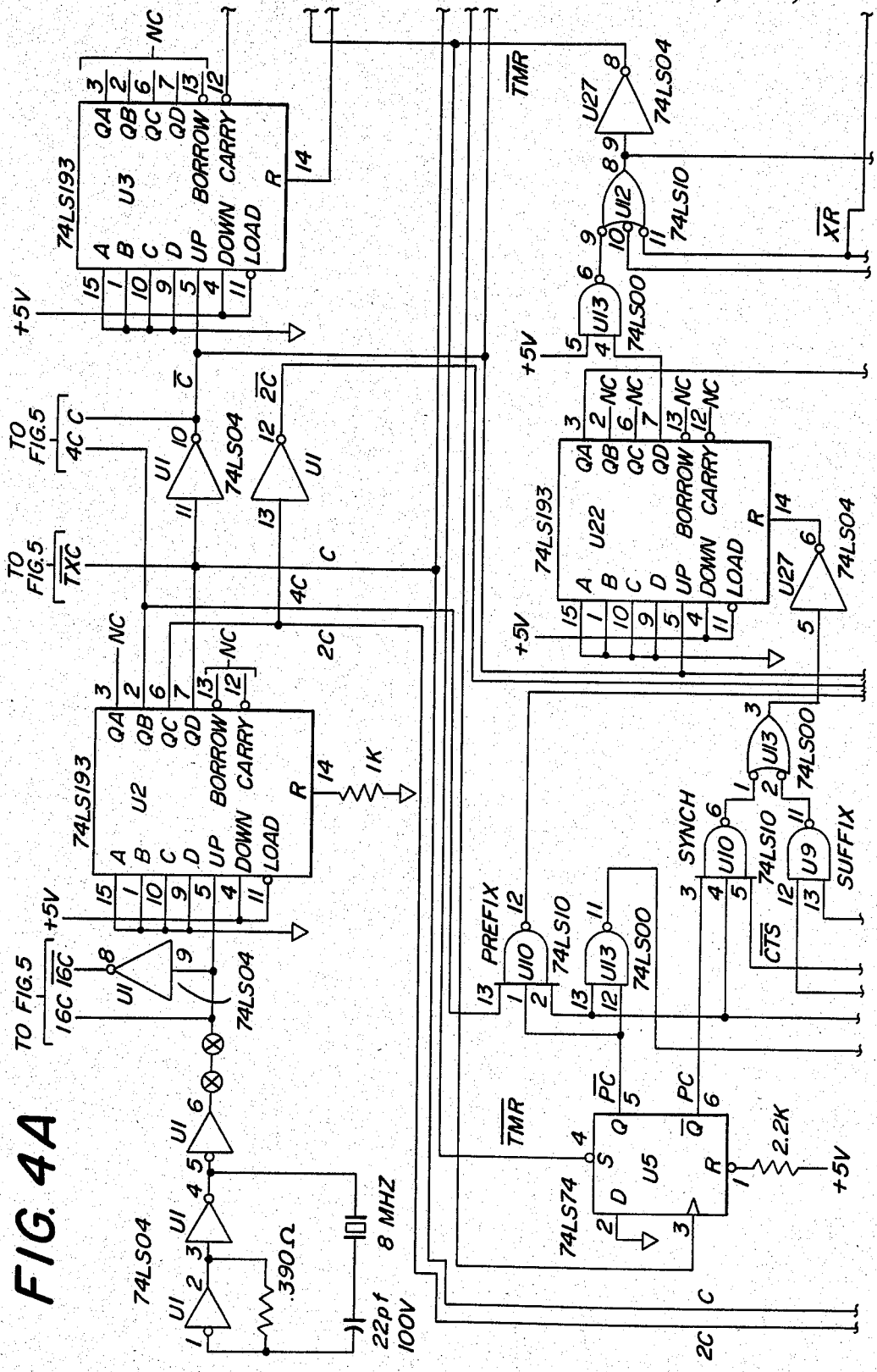
FIG. 4 shows how FIGS. 4A, 4B, 4C, 4D, 4E, and 4F should be juxtaposed to provide a detailed circuit diagram of the transmitter section.
Figure 4B:
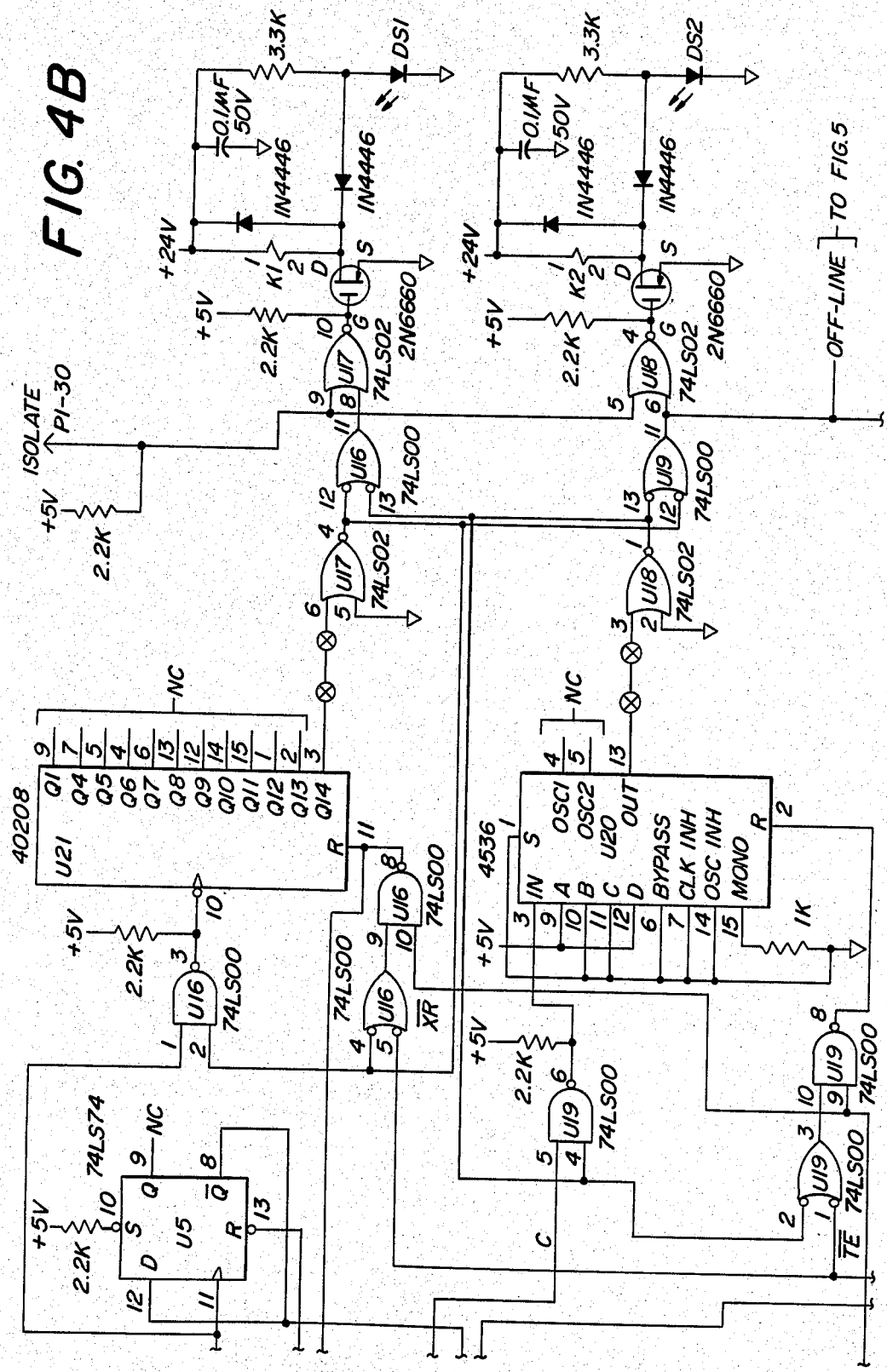
Figure 4C:
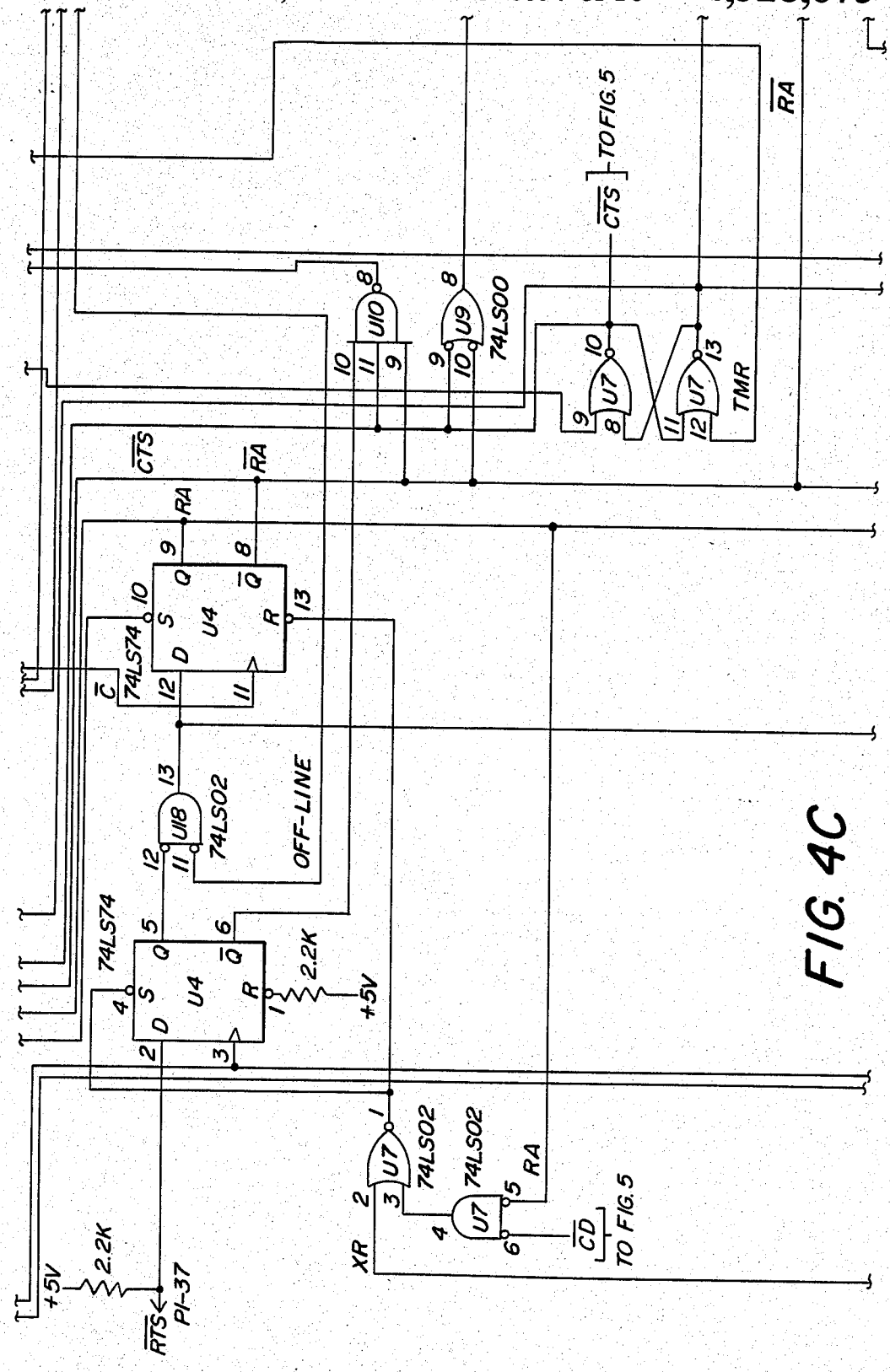
Figure 4D:
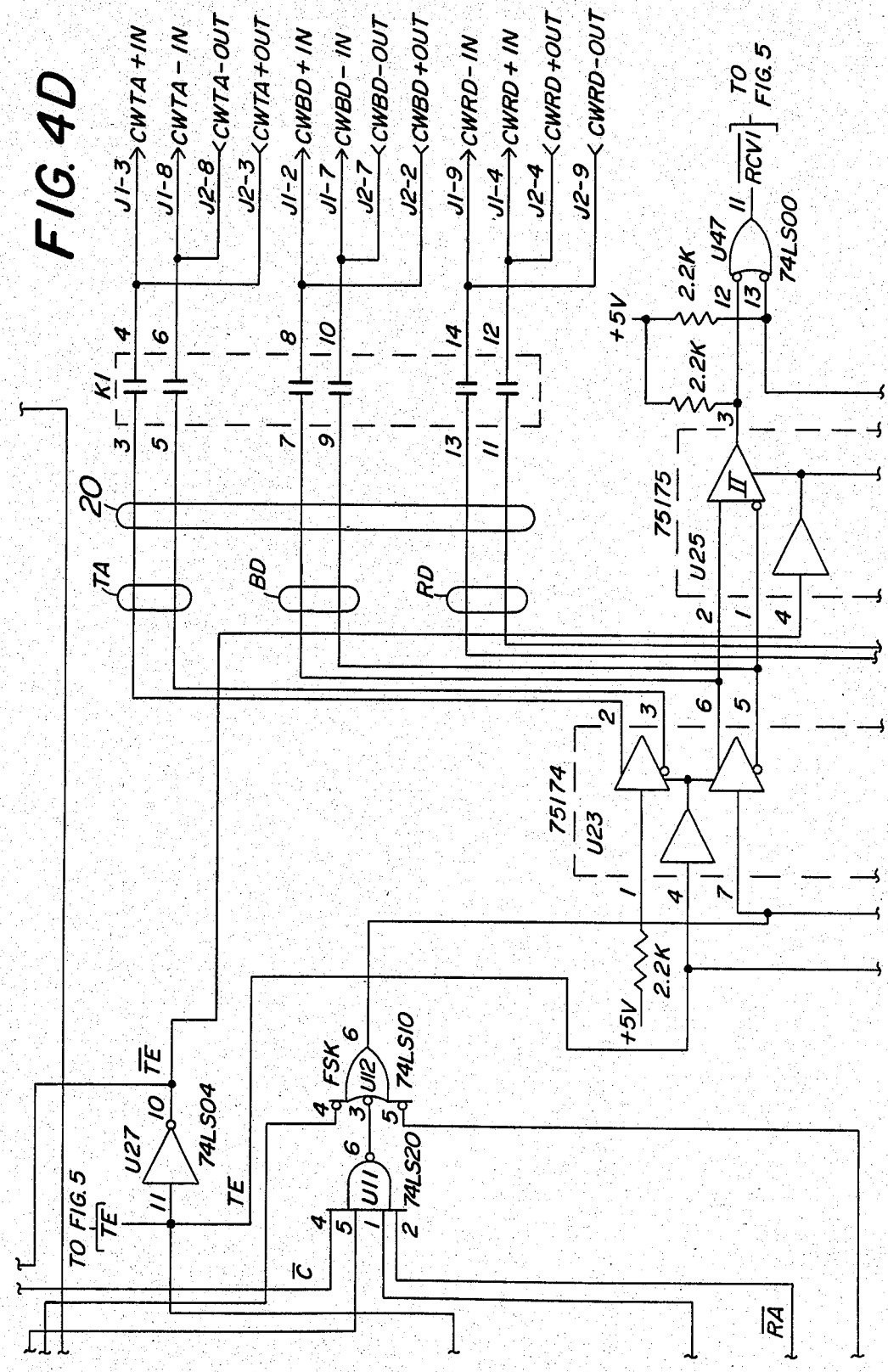
Figure 4E:
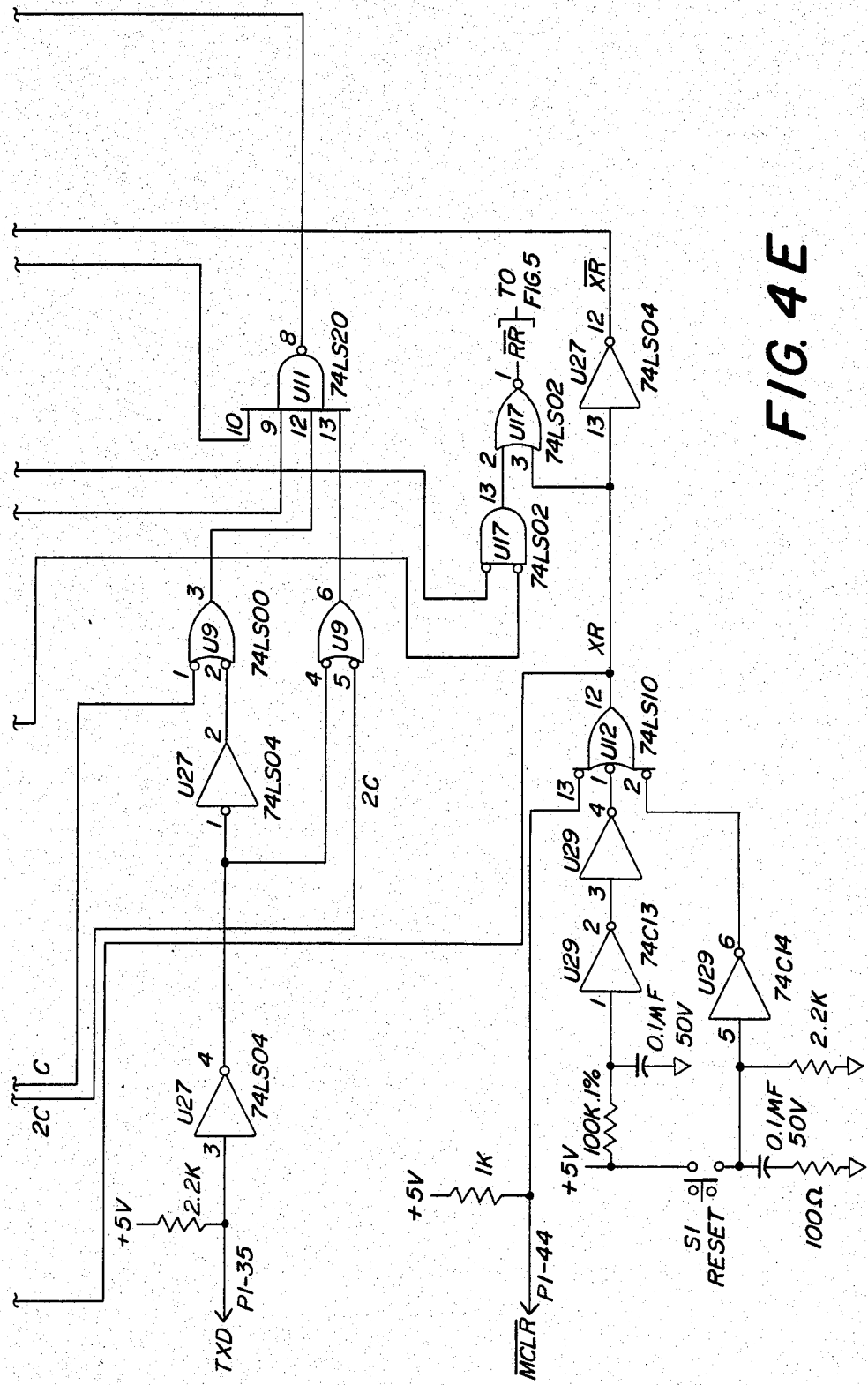
Figure 5A:
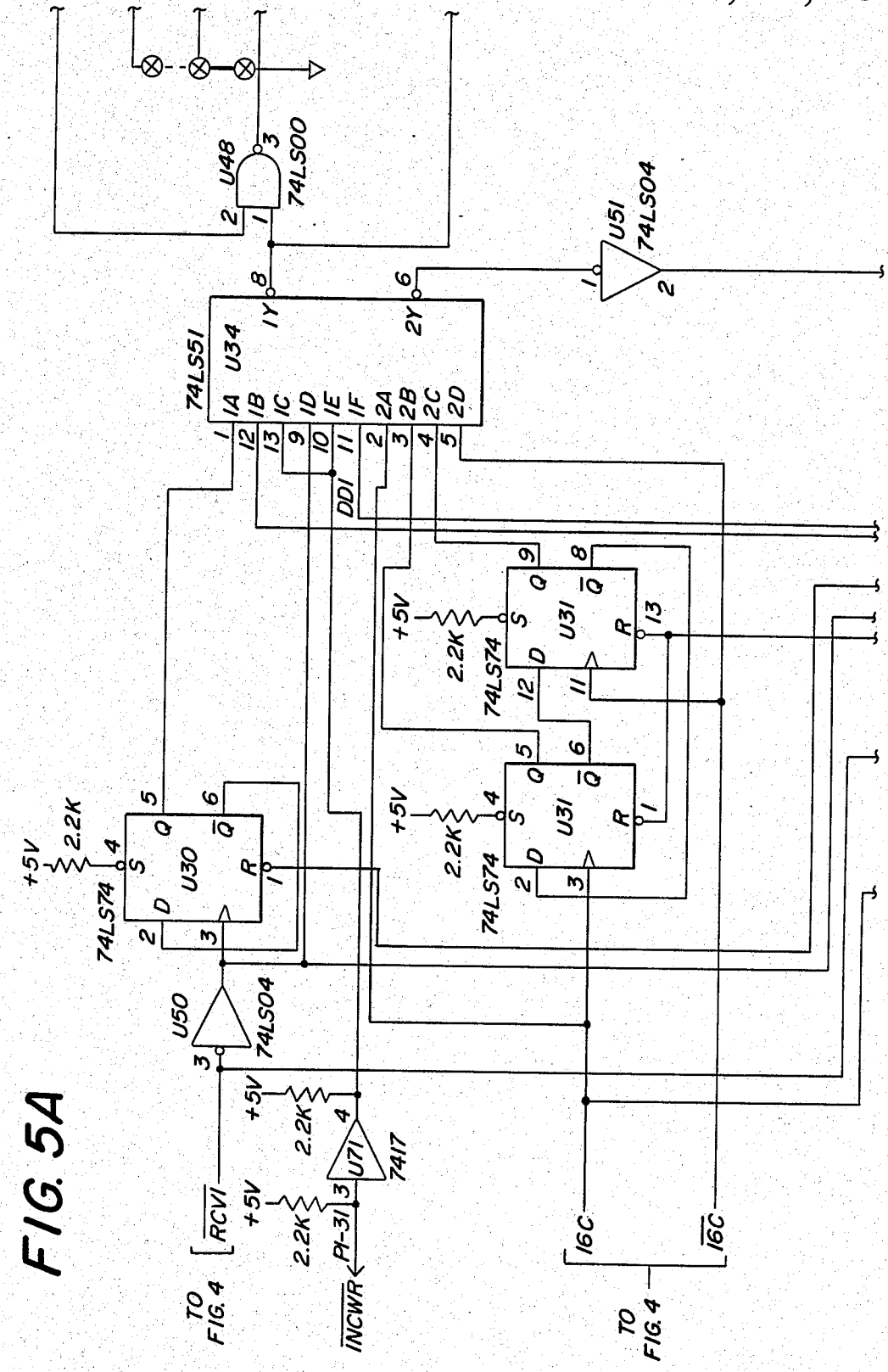
FIG. 5 shows how FIGS. 5A, 5B, 5C, 5D, 5E, 5F, and 5G should be juxtaposed to provide a detailed circuit diagram of the clockwise receiver section.
Figure 5B:
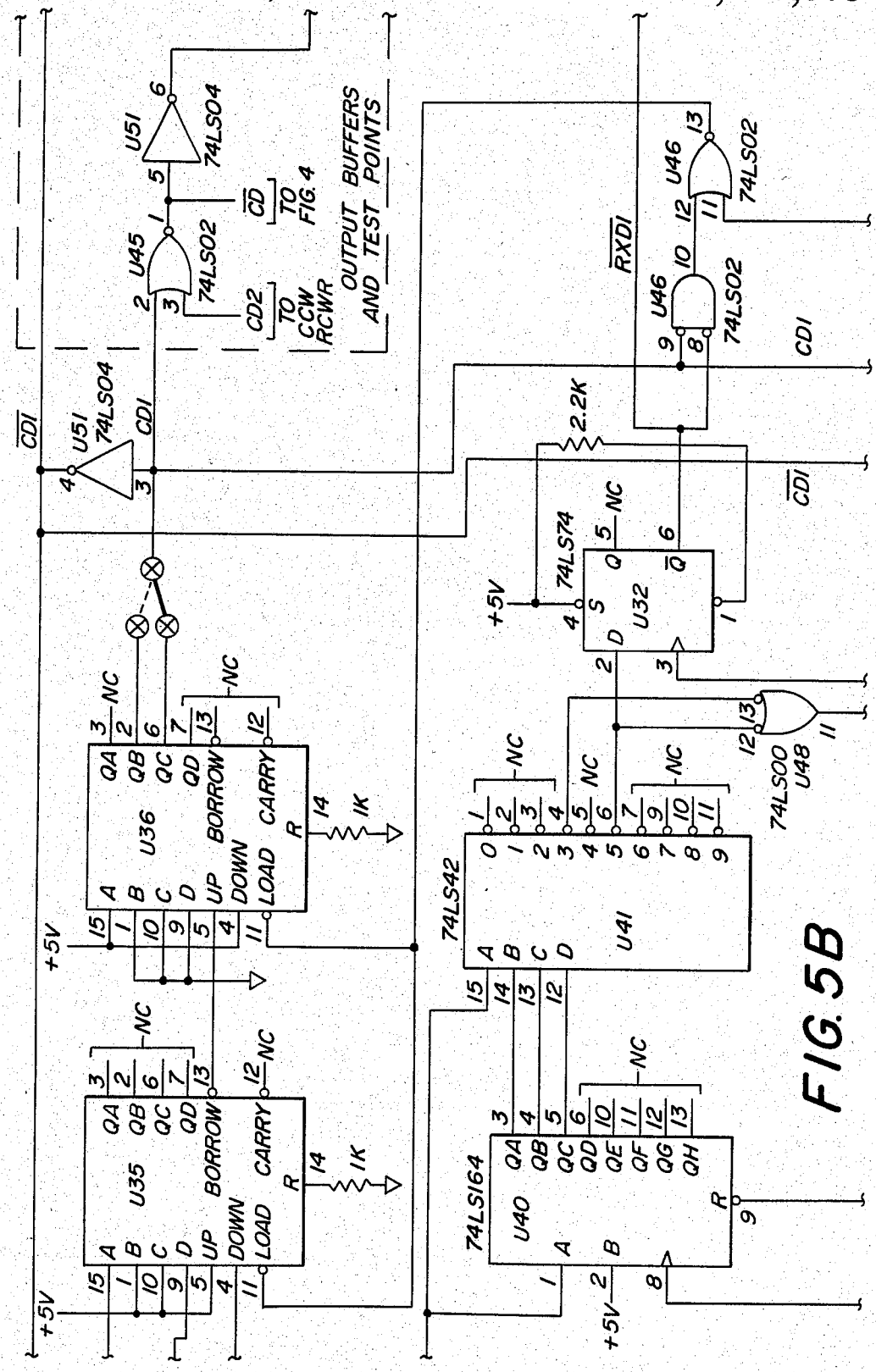
Figure 5C:
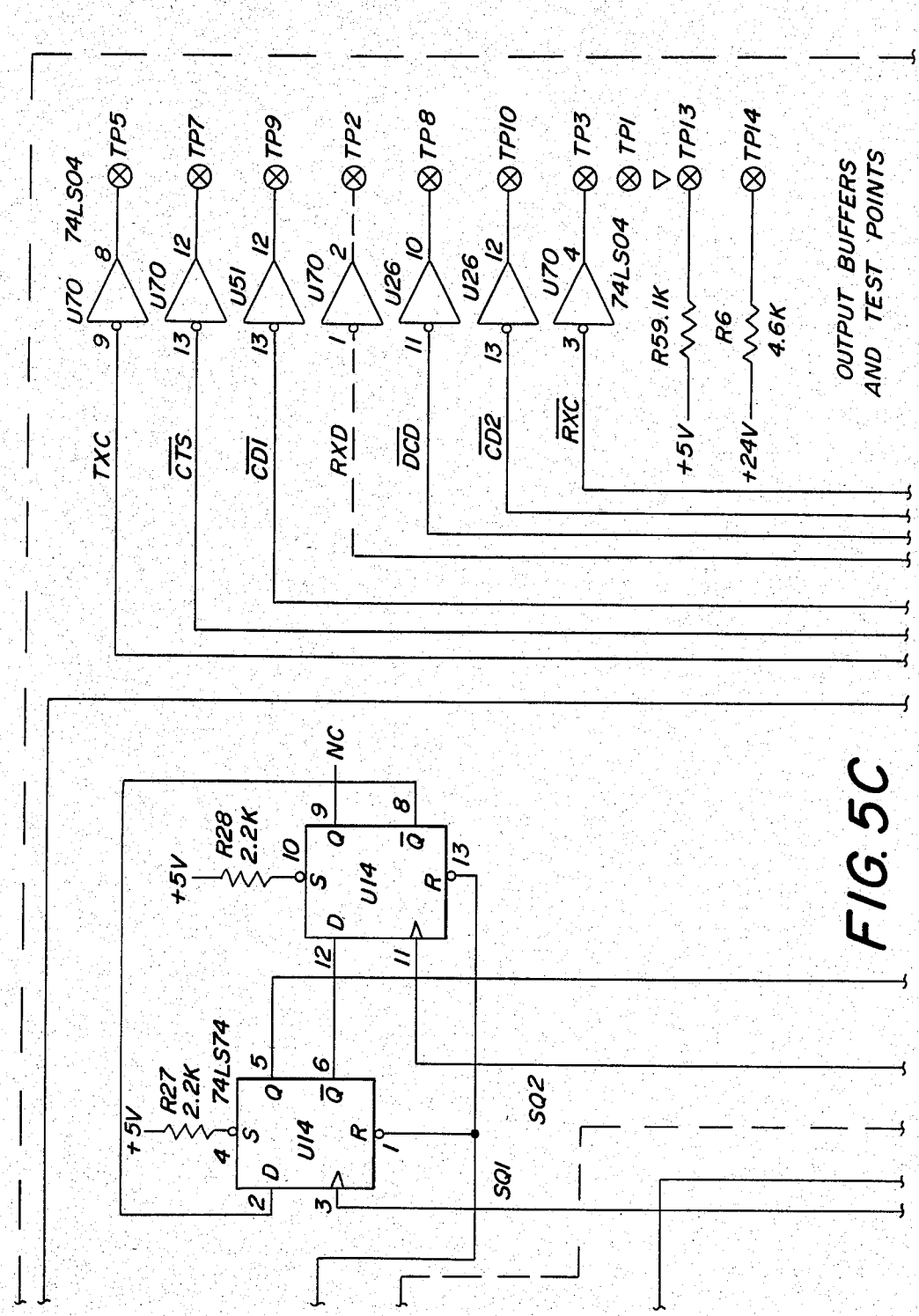
Figure 5E:
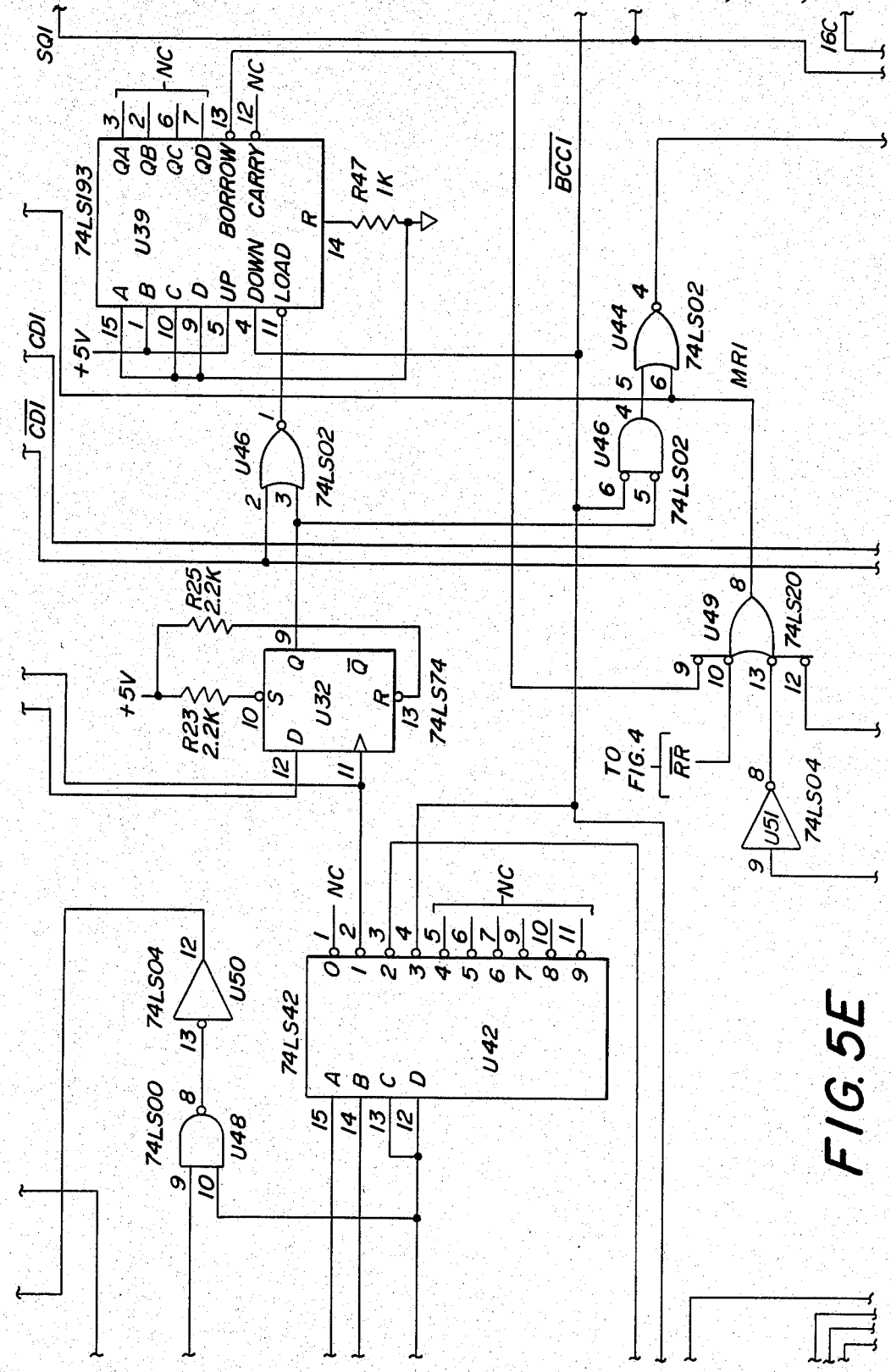
Figure 5F:
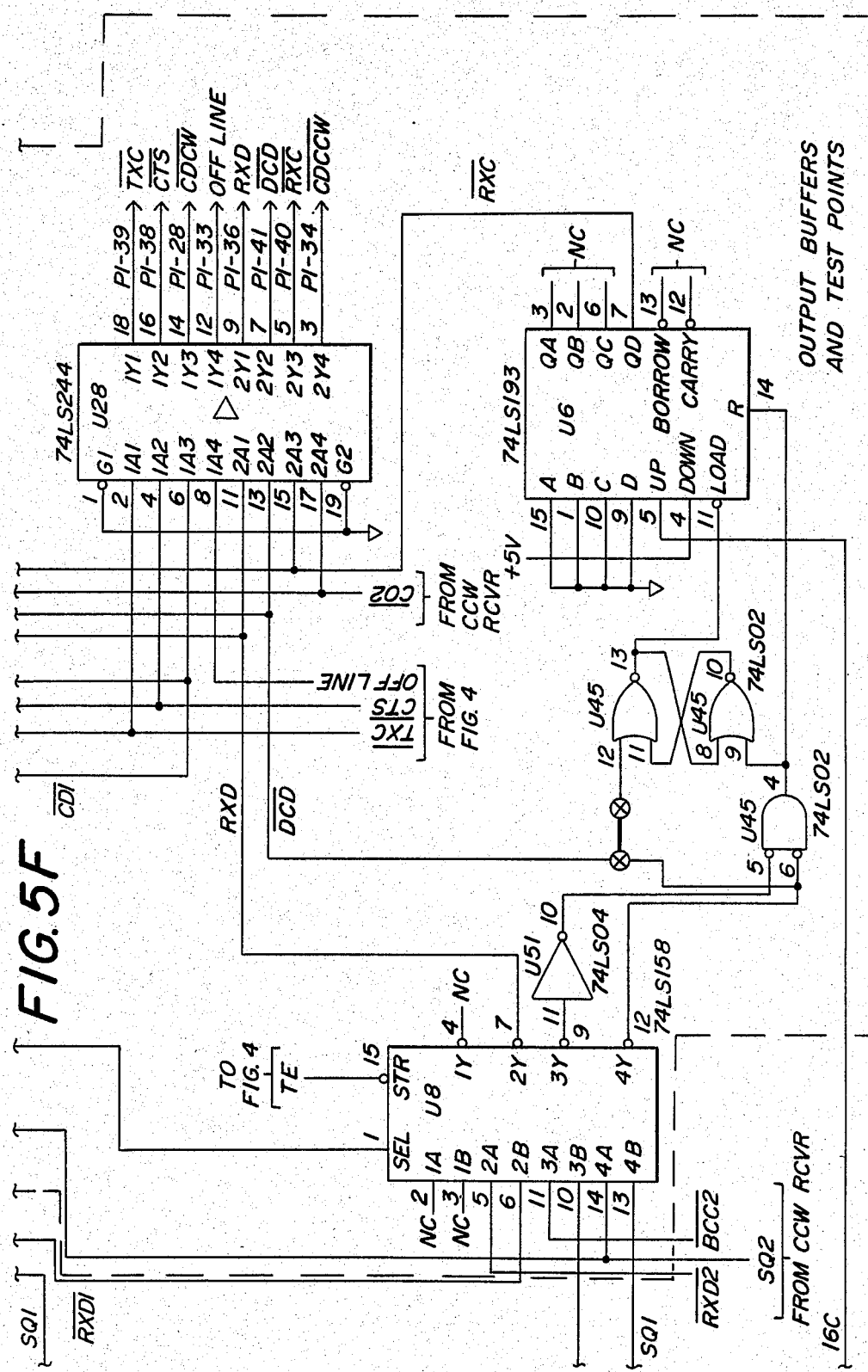

As previously stated the modem described here is a single transmitter, dual receiver, frequency-shift-keyed device. It preferably makes use of a coding structure having a prefix comprised of a train of pulses at a multiple or a submultiple of a baseband frequency which is followed by a data stream having one binary state transmitted at said baseband frequency and the other binary state transmitted at half the baseband frequency. The data stream is terminated with a suffix having a waveform different than the waveform of said binary states. As shown in FIG. 3, the 2.0 mhz, 1.0 mhz (the baseband frequency) and 0.5 mhz pulse rates represent the prefix, "zero" data bits, and "one" data bits, respectively. The prefix consists of 128 pulses, the last of which will be followed by a 2.0 microsecond low time, which is the data "synch". The first leading edge after this synch is the start of the data. At the end of the modulated data stream the transmitting modem adds a suffix. This is a stream of three 0.5 microsecond pulses, each of which is followed by a 1.5 microsecond low time, to indicate "end of message".

With the novel coding structure described above it is possible to use as the prefix a signal which is half the lower coding frequency (250 khz) instead of one which is twice the upper frequency, as shown.

FIGS. 4 and 5 show the detailed circuitry for the transmitter and the clockwise receiver, respectively, of modem 40. The circuit for the counterclockwise receiver is the same as for the clockwise receiver except that the box indicated as Output Buffers and Test Points is ommited as only one such circuit is needed. In these circuits the signals are as indicated below. The slash "/"

following a signal name indcates the barred sense for that signal.

LOGIC INPUTS

RTS/, request to send/: A low signal will initiate transmission unless there is an active carrier detect. Once initiated, transmission will not be affected by carrier detect and will be sustained until six to eight microseconds after RTS/ goes high.

TXD, transmit data: A high will cause the modem to transmit a mark (one cycle of a 500 khz square wave). A low will cause a space (two cycles of a 1.0 mhz square wave).

TXD/, transmit data/: A low will cause a transmitted mark and a high will cause a space.

ISOLATE: A high will de-energize the relays which will isolate the modem drivers and receivers from the multipoint cables.

INCWR/, inhibit clockwise receiver/: A low will cause all data entering the clockwise receiver to be interpreted as invalid.

INCCWR/, inhibit counterclockwise receiver/: A low will cause all data entering the counterclockwise receiver to be interpreted as invalid.

LOGIC OUTPUTS

CTS/, clear to send/: Goes low after prefix and dead time have been transmitted by modem and remains low until six to eight microseconds after RTS goes high.

RXD, receive data: A high which is present whenever RXC/ goes high (indicates a received mark, a low indicates a received space).

RXD/, receive data: A low which is present whenever RXC goes high (indicates a received mark, a high indicates a received space).

RXC/, receive clock: A 500 khz square wave clock which goes high near the midpoint of each received data bit time.

TXC/, transmit clock/: A 500 khz square wave clock which should, when the modem is transmitting, cause a new data bit to be provided at TXD (or TXD/) on each falling edge. The processor card uses this signal to clock out the message that it wants to transmit.

CDCW/, carrier detect clockwise/: Goes low when the clockwise receiver detects 80 consecutive valid prefix pulses and goes high when the suffix is received or when any other master reset condition is satisfied.

CDCCW/, carrier detect counterclockwise/: Same as above except for counterclockwise receiver circuitry.

DCD/, data carrier detect/: Goes low at the first data transition following the two microsecond synch time, which follows the prefix. One or both of the receiver circuits must have decoded a valid carrier in order to permit this signal. In the case where both carriers have been accepted, the first receiver to detect the synch and data will provide this signal and will lock in the rest of the message.

OFFLINE: There are two jabberhalt timers which can time out if the transmitter is enabled for 262 milliseconds or longer. If either of these times out, this signal will go high and the relays will be de-energized thereby isolating the modem from the local highway.

LINE I/O DESCRIPTION

CWBD, clockwise bidirectional data: This is an input/output pair which is connected to a differential driver/receiver pair. It is normally receiving serial data from the line. When it is required to transmit data onto the line, the receiver is disabled and the transmitter is enabled.

CCWBD, counterclockwise bidirectional data: Same as above except for counterclockwise line.

CWTA, clockwise transmitter active: This is an output pair which is connected to a differential driver. The driver is normally in a tri-state (high impedance) mode, but when the modem transmits, it drives the CWTA line high.

CCWTA, counterclockwise transmitter active: Same as above except for counterclockwise line.

CWRD, clockwise ring data: This is an input pair which is connected to a differential receiver. The receiver is normally disabled but when the modem is transmitting it is enabled and effectively replaces the CWBD receiver. This causes the message which is being transmitted onto the CWBD line to travel completely around the highway loop and back into the modem via the CWRD line. Hence the highway continuity can be checked on each transmission.

CCWRD, counterclockwise ring data: Same as above except for counterclockwise line.

CIRCUIT OPERATION

Transmitter (FIG. 4)

The system of FIG. 1 may advantageously use a "token passing" scheme to insure that, under normal operation, only one station will be transmitting at a time. The highway processor of the transmitting station will initiate this transmission by pulling the RTS/ line of its modem low. This signal will be clocked into a flip-flop (U4) by the 500 khz clock signal (C) of the modem unless, either there is an "external reset" (XR), or a "carrier detect" (CD) is present on one of the two receiver circuits. When it is clocked in, it will cause a "transmitter master reset" (TMR) which will reset the prefix flip-flops (U5) and the "clear to send" (CTS) S-R latch which consists of two cross coupled gates (U7). If the modem is not "off line", the inverted 500 khz clock signal (C/) will then clock a high into the second stage of the flip-flop (U4) which will result in the "request accepted" (RA) signal on pin 9.

If carrier is detected by either receiver circuit before RA goes high, a low signal (CD/) on U7 pin 6 will cause a high on U7 pin 3, which will hold the first stage of U4 in a preset state and the second stage in a clear state. An XR signal at U7 pin 2 will have the same result. An XR signal will occur if the modem reset button (S1) is pushed or if an "initialize" signal is present at the proper input.

If carrier is detected by either receiver circuit after RA goes high, there will be no effect on the transmitter circuitry. When RTS/ goes high after RA goes high, the modem will generate a suffix pattern and terminate transmission, unless it is in the midst of transmitting a prefix. In the latter case it will finish out the entire prefix, synch and suffix and then terminate the transmission.

When a request is accepted, it enables the prefix gate U10 by making pin 2 high. Pin 1 is already high and pin 13 has the 4C signal (2.0 mhz) on it. U10 pin 12, therefore, drives U12 pin 4 with a 2.0 mhz square wave. Pins 3 and 5 of U12 will be high, therefore the output of this gate (pin 6) will be a 2.0 mhz square wave which is applied to the clockwise and counterclockwise line driver circuits which are part of U23.

At the same time that the 2.0 mhz prefix is being applied to the line drivers, the RA/ signal is applied to U9 pin 10 causing a transmitter enable or "TE" signal. This signal enables the tri-state line drivers on the "BD" lines and also the "TA" lines and at the same time it disables the receiver circuits on the "BD" lines and enables the receivers on the "RD" lines. The TE/ signal is simultaneously applied to U19 pin 1 and U16 pin 5, whereby it enables the U20 counter and the U3 and U21 counters.

U3 is the prefix counter. It counts sixteen C/ pulses and then toggles the first stage of U5. It counts a second set of sixteen C/ pulses and again toggles the first stage of U5, which this time clocks a low into the second stage of U5. This signal (U5 pin 5) going low indicates that the prefix is complete. It disables the prefix gate via U10 pin 1, and its complement enables the synch gate via U10 pin 3. It should be noted that while the prefix counter is counting thirty-two pulses at 500 khz, the transmitter is sending 128 pulses at a 2.0 mhz rate.

U21 is the main jabberhalt timer. It is a fourteen stage counter which counts the "carry" pulses out of U3. This means it counts sixteen C/ pulses (32 microseconds total). 2 EXP 13 (8,192) times. Hence, the counter will time out in 0.262 seconds and will drive U17-14 low, thereby locking up the counter and turning off Q1 and Q2. The K1 and K2 relays will be de-energized and the DS1 and DS2 LEDs will light. Since the "TE" signal enables this sequence, the result is that the main jabberhalt counter will remove the modem from the communication lines whenever the modem transmits continuously for 262 milliseconds or more.

If for some reason the main jabberhalt does not work, U20 is a redundant timer. It is a programmable counter which is set for 18 stages, hence it counts 2 exp 17 (131,072) pulses of the 500 khz (2 microseconds) clock. Again, this is 0.262 seconds, and if it times out it will lock up and de-energize both relays.

When the "prefix complete" signal enables the synch gate by making U10-3 high, it causes the clear input on U22 (pin 14) to go low and allows it to start counting C/ pulses. Since the "PC" signal is actually derived from a C/ pulse, the first stage of U22 will go high almost exactly one clock period or 2 microseconds after the last prefix pulse goes low. When it goes high (U22-3) it will drive U7-10 (CTS/) low, which will disable the synch gate (U10-5) and put U22 back in the "clear" state. The U7-10 signal is CTS/ and is cross coupled to U47-11, whereby it latches in the "clear to send" (CTS) at U7-13. The CTS signal is applied to U11-10 where it enables the modulated data signals present on pins 12 and 13, to combine and drive pin 5 of U12. As in the case of the prefix and synch, U12-6 provides the modulated data to the differential drivers.

The CTS/ signal is provided to the highway processor via modem pin P1-38, along with the TXC/ (transmit clock/) on pin P1-39. When the CTS/ goes low it tells the processor that it can now use the TXC/ signal to clock data to the TXD (transmit data) modem input on pin P1-35. This data is then modulated by U9 (pins 3 and 6) and combined in U11 as described above.

When the station processor is finished clocking out its data, it drops the request to send, i.e. drives P1-37 of the modem high. This signal is clocked into the two stages of U4, as before, and when RA goes low it disables one of the U11 gates via pin 9. Meanwhile RA/ goes high, enables the U22 counter again via U9 pin 12, and provides an enable to U11-2. The latter gate constructs the suffix bit which is "true" for one-half microsecond and false for one and one-half microseconds. The U22 counter counts C/ pulses again. The first counter output, as before, goes high after 2.0 microseconds and tries to set the CTS latch which is already on. The counter then counts 4.0 more microseconds at which time the first and second stage outputs go high and drive U13-6 low. This results in a "transmitter master reset" (TMR) at U12-8, which resets the S-R latch providing CTS and CTS/. When CTS goes low, it causes U9-11 to go high, which causes the clear input of U22 (pin 14) to go high and therefore removes the TMR signal. Hence, the TMR signal is present for the time it takes to propagate itself thru six levels of gating and the U22 counter.

During the six microseconds between when RA goes low and CTS goes low, eight contiguous suffix bits are transmitted. The CTS/ signal going high then cuts off transmission by causing TE to go low. The prefix and jabberhalt counters are caused to go to a clear condition by TE/ going high while the "prefix complete" flip flop is preset by TMR/.

To summarize the transmission sequence: the modem, when it accepts a "request to send", transmits a prefix and synch and then supplies a "clear to send" to the station processor. The data is then clocked into the modem, modulated and transmitted. When all of the data have been sent, the station processor removes the request from the modem which causes it to transmit a suffix, turn off the transmitters and remove the CTS. It is then ready to receive or transmit.

While the above transmission is taking place on the "BD" lines, a "high" level is being transmitted on the "TA" lines, and the transmitted signal is being received on the "RD" lines. Since the "RD" signal may have traveled around an optical ring of up to 7 kilometers, it can be delayed from the "BD" signal by 35 microseconds or more (approximately 5 microseconds/km).

Receiver (FIG. 5)

When a station processor does not have the "token", it cannot transmit, therefore the associated modem simply receives every message that comes down the line and provides it to the processor circuit. Each message will come into both the BD1 (CWBD) and BD2 (CCWBD) lines, but one may be delayed by up to 35 microseconds (or more) from the other.

The following discussion will refer to the logic designations of the clockwise receiver circuit with the understanding that the counterclockwise receiver (not shown) is similarly constructed and works in an identical manner.

The "BD1" signal is delivered to the clockwise receiver as RCV1/ and enters a modifying circuit shown here as a divide-by-two circuit (U30 pin 3) and bypass gating (U34-9). The divide-by-two converts the 2.0 megahertz prefix pulses into a symmetrical 1.0 megahertz pattern which can be decoded in the same manner as a data stream of zeros. Once the prefix is detected, giving carrier detect (CD), and subsequently the synch is detected, giving DD1, the bypass gating takes effect. Hence, U34-8 will have RCV1/ divided by two on it for the duration of the prefix and synch, after which it will have RCV1/ on it. This signal (U34-8) is sent to the "received prefix counter" circuit (U48-1) and the "bit decoder" circuit (U40-1 and U41-15).

Meanwhile RCV1/ also goes to U30-10 and RCV1 goes to the "synch and dead line timer" circuit (U44-2).

When the former goes low it starts the "first edge clock" circuit and the "decode cycle counter/timer" circuit. The first edge clock circuit includes U31 and the U34 gating that follows it. When U30-9 goes high, it removes the clear condition on both stages of U31 (pins 1 and 13) and allows the first stage to see a clock edge to clock a "one" into its "Q" output. Hence, if 16C goes high first, after the clear goes away, U31-5 will go high and 16C will be the output of U51-2. If 16C/ goes high first, it will be the output. Since 16C and 16C/ are 8 mhz signals which are out of phase, the signal at U37-5 will be an 8 mhz signal which is synchronized to the RCV1/ signal going low. The first edge of this signal will occur approximately 50 to 113 nanoseconds after RCV1 goes low.

U37 and U42 along with U48-8 and U50-12 provide a timer for establishing the bit time and for clocking the decoding function of the decoding circuit, consisting of U40 and U41. When the clear is removed from U37-14, by U30-8 going low, the counter will start to count the 8 mhz clock periods. When the second, sixth, and tenth periods go true, U50-12 will go high and will clock the U40 shift register. The "modified" message pattern which is present at U40-1 will, therefore, be "sampled". Each two microsecond bit time is divided into sixteen sections and the value of the pattern at the start of the second, sixth and tenth sections will be successively entered into the shift register. At the beginning of the thirteenth section U42-2 will go low and then high again at the beginning of the fourteenth. When it goes high it transfers the value of U41-6 and U48-11 into U32-6 and 9 respectively. Since the first three samples of the pattern are at U41 pins 12, 13 and 14 at this time, and the present value is at pin 15, the output at pin 6 will be low only if these time samples were: low, high, low, high (0101). This is the result of receiving either a data zero or a bit time of prefix pulses which are divided by two. If the time samples were low, low, high, high (0011), the pattern would have been that of a data one and U41 pin 4 would be low.

Since the output of U41-6 is transferred to U32-6, this output will be low when zero is decoded and high when something other than a zero is decoded. We can, therefore, use this signal to represent received data (RXD) but an additional piece of information is required. Since both outputs of U41 are "ORed" together to produce U48-11, this output will be high only when a valid "zero" or "one" pattern has been decoded. This "valid data" information is transferred into U32-9.

After the zero and valid data information is latched, a low pulse (representing the fourteenth section of the bit time) goes from U42-3 to U30-1 to clear the divide-by-two flip-flop. This should only be necessary if the first decode cycle is out of synch with the first data bit at the beginning of a prefix. Next a low pulse representing the fifteenth section of the bit time goes from U42-4 to U30-13 which clears the first edge clock and counter/timer circuits and leaves the circuitry ready to decode the next bit time. This pulse also goes to U46-6 and U8-10. The former signal is used to preset the squelch flip-flop if a bit is decoded as invalid, while the latter goes to the vying logic, where it is used to sychronize the receive clock, depending on which receiver circuit has been selected.

Since the 2.0 mhz prefix is divided by two and will look like a 1.0 mhz "zero" pattern to the decode logic, it will cause RXD1/ (U32-6) and valid data (U32-9) to go high. The former will cause U46-10 to go low, which will normally remove the low "load" signal from the received prefix counter circuit (U35-11 and U36-11) and enable it to start counting the 1.0 mhz pulses. The U35 counter will count down on the positive pulses from U48-3. Since it is normally preset to seven, it will output a low pulse at pin 13 on the eighth count. It will rollover and output a second pulse on the twenty-fourth count and then rollover a second time and output a third pulse on the fortieth count. Hence, it takes eighty 2.0 mhz prefix pulses to supply three pulses to U36-5. Since the U36 counter is preset to one, the "four" output, pin 6, will go high after the third input pulse goes high. This output is the "carrier detect" (CDI) and it locks itself on by inhibiting further counts via U48-2 and by inhibiting a decoded non-zero from reloading the counters via U46-9. Since it takes at least one bit time to decode the first zero which will enable counting, and since it is not certain what occurred immediately before the first prefix pulse, it may take anywhere from 84 to 92 of the 2.0 mhz pulses to cause "CD". The latter number is possible because it may take a couple of bit times for the decode cycle to get in synch with the message.

When CD1 goes high, CD1/ goes low (at U44-3) and causes the signal at U44-1 and U50-6 to be the same as RCV1/. This will cause the U38 counter to be loaded to a count of twelve every time RCV1/ goes low. When the modem is in the "look for prefix" mode, DD1 is low and DD1/ is high (at U47-4). This causes the 16C (8 mhz) signal to be gated to the down count terminal (pin 4) of the U38 counter, except that whenever RCV1 goes low it will pull this clock line high (while the counter is being loaded). As a result, the counter will output a pulse at pin 13 when RCV1/ is high for thirteen (+1, −0) counts of the 8 mhz signal. This is equal to 1.625/1.75 microseconds and, since the "synch" space is equal to 2.0 microseconds, the counter will clock a zero into U33-5 slightly before the first data bit starts. U33 is part of the synch detecting circuit which also includes U44-10, U44-13, and U50-10. The "RCV1" signal will be holding U44-9 low and U44-10 high at this time, but when the first data pulse goes high, U44-10 will go low causing U44-13 to go high producing the synch detect signal DD1 and the cross-coupled gates will latch in this state. When DD1 goes high it will clock a high into U33-8 (SQ1 or squelch 1). DD1 and DD1/ also cause the divide-by-two function to be bypassed via U34 pins 2 and 11, and gates the 4C (2 mhz) signal to the U38 counter whenever RCV1 is low. This latter function causes U38 which with U47-8 functions as a dead-line timing curcuit to time out a second time in 6.5/7.0 microseconds if, for some reason, the incoming signal goes low for this period of time. If it does time out a second time, the output pulse will be inverted and applied to U47-10. Since U47-9 is now high, U47-8 will deliver a low pulse to U49-12 which will result in a "master reset" (MRI) pulse at U49-8. A master reset, however it is generated, will preset squelch to a low and will load the CD counter, thereby resetting CD to a high and enabing the counter circuit. The receiver will then be back in the "look for prefix" mode.

The U39 counter is the "invalid bit" counter. It is held in a load state, with a count of two, whenever carrier detect is not true. Once carrier is detected it will be held in the load state as long as valid bits are decoded. If three successive decode cycles result in U32-9 (valid data) being low, the BCC/ pulses at pin 4 will cause the counter to count down and output a low pulse at pin 13, and this will cause a master reset. The fact that three successive bad bits are required for carrier detect to be dropped means that it is less probable that a noise burst will cause the modem to reset CD in the middle of a message. If this occurs, there is a possibility that the processor circuit will try to transmit while it still has an incoming message. The suffix, which is appended to the end of each message, is constructed of eight successive invalid bits.

If a single invalid bit is decoded it will cause the bad bit circuit which includes U46-4 to operate by causing U46-5 to go low and a short time later BCC/ will pull U46-6 low. The resulting high pulse on U44-5 will cause a low on U33-10, thus causing the squelch flip-flop to be preset. Hence, whenever data is being received and any bit is decoded as invalid, the "SQ" will go low. As will be seen below, this will cause the DCD/ signal to the processor to go high if the error occurs in the receiver which has been selected by the vying logic.

The U43 counter counts C/ (500 khz) pulses as long as carrier detect is true. It is reset to zero by CD1/ being high and is programmed to time out if this signal goes low and stays low for 524 milliseconds (2 exp 18 counts). If it times out, it will generate a master reset, because during normal system operation a message should never last for even 250 milliseconds. If a system failure (such as a jabberhalt) occurs, however, it could leave an optical ring filled with valid data and could freeze all of the modems in the system. The U43 counter(s) will, under this failure condition, reset the modem receiver(s) and allow the system to recover.

When a station does not have the token, both receivers of each modem are listening to the same messages. Which receiver gets a particular message first will depend on whether the distance from the transmitting station is shorter over the clockwise or counterclockwise path. The receiver which detects carrier, synch, and squelch first, will be selected by the vying logic and its SQ signal will be gated thru to the processor as DCD. Also, its data (RXD1/ or RXD2/) will be gated through RXD and its BCC pulses will be gated thru to generate RXC.

SQ1 and SQ2 are used as clock inputs to U14 pins 3 and 11 respectively. If SQ1 occurs first U14 pin 5 will go high, but if SQ2 occurs first, pin 8 will go low and will guarantee that pin 5 stays low. Both stages of the U14 flip-flop which make up the first-carrier-selection circuit will normally be held in a clear state with pin 5 low and pins 6 and 8 high. If either carrier detect (CD1 or CD2) goes high it will cause pins 1 and 13 to go high, thereby removing the clears. The signal on U14-5 acts as a selector on U8-1, while TE (from the transmitter) being low acts as an enable. If the modem were transmitting the TE would be high and would inhibit the DCD/, RXD, and RXC/ signals from getting to the processor card. If SQ1 occurs first and U14-5 goes high, SQ1 is enabled through U8-13 to become DCD/, RXD1 is enabled through U8-6 to become RXD and BCC1 is enabled through U8-10 to U45-5. When DCD/ goes low at U45-6, it enables the selected BCC/ pulses to generate high pulses at U45-4. It also removes the high on U45-12 which allows the first high pulse at U45-9 to flip these cross-coupled gates, thereby making U6-11 high and taking this counter out of the load state. The high pulses are also applied to the clear input so that every time the selected receiver generates a BCC/ pulse, the counter is re-zeroed. Beween pulses it is allowed to count the 16C (8 mhz) pulses, and when eight pulses have been counted, the output at pin 7 will go high. The result is a 500 khz signal (RXC/) which is synched to the selected receiver and which goes high 1.25 microseconds ($\frac{5}{8} \times 2.0$) after each data bit starts in the RXD data stream.

What is claimed is:

1. In a communications system having bidirectional loops making up redundant global data highways with corresponding redundant local highways connecting each of a plurality of stations thereto at nodes of the global highways, a modem providing an interface between a data bus of each station and said highways, comprising:

a transmitter operative to simultaneously transmit data from said station data buses to both of said highways in the form of frequency-shift-keyed signals coded to provide a prefix consisting of a predetermined number of pulses of a frequency which is a multiple or submultiple of a predetermined baseband frequency followed by a synch period of one bit time with no pulses which is in turn followed by data which in one state is at the baseband frequency and in the other state is at another frequency with the data being followed by a suffix having a fixed number of bit times without a valid data signal; and a separate receiver for each of said redundant highways, each of said receivers including:

a clock circuit synchronized with the data received for producing clock pulses to the circuits of said receiver, timer means responsive to said clock circuit for establishing a bit time period, a modifying circuit connected to receive incoming signals and operative during the initial period of signal reception after the receiver circuits have been reset to a look-for-prefix mode to convert the received prefix signal to the baseband frequency.

a decoding circuit selectively connected to the output of said modifying circuit during said initial period and connected to receive said incoming signals after said prefix is completed, said decoding circuit producing an output indicative of one state for the baseband frequency and the other state for the other frequency, a prefix counter operative to count said received signals during said initial period and to produce a carrier-detect signal indicative of receipt of a predetermined number of pulses at the prefix frequency, a synch-detecting circuit connected to receive said incoming signals and operative to produce a synch-detect signal when detecting a bit time without a valid data bit in the received signal, a bad-bit circuit connected to the output of said decoding circuit and operative to produce a bad-bit signal during each bit time when no valid bit has been decoded, a first-carrier-selection circuit operative in response to both a carrier-detect signal and a corresponding synch-detect signal along with an absence of a bad-bit signal to cause a selection of the corresponding receiver as the one from which data is passed to the station data bus, bypass gating means operative in response to said synch-detect signal to cause the received signals to bypass the modifying circuit, and a dead-line timing circuit operative to reset all receiver circuits to a look-for-prefix mode after a predetermined time period has elapsed with no carrier-detect signal or incoming data signal.

2. In a communications system having bidirectional loops making up redundant global data highways with corresponding redundant local highways connecting each of a plurality of stations thereto at nodes of the global highways, a modem providing an interface between a data bus of each station and said highways, comprising:

a transmitter operative to simultaneously transmit data from said station data buses to both of said highways in the form of frequency-shift-keyed signals coded to provide a prefix consisting of a predetermined number of pulses of a frequency which is a multiple or submultiple of a predetermined baseband frequency followed by a synch period of one bit time with no pulses which is in turn followed by data which in one state is at the baseband frequency and in the other state is at another frequency with the data being followed by a suffix having a fixed number of bit times without a valid data signal; and a separate receiver for each of said redundant highways, each of said receivers including;

a prefix counter operative to count said received signals during said initial period and to produce a carrier-detect signal indicative of receipt of a predetermined number of pulses at the prefix frequency, a synch-detecting circuit connected to receive said incoming signals and operative to produce a synch-detect signal when detecting a bit time without a valid data bit in the received signal, a bad-bit circuit connected to the output of said decoding circuit and operative to produce a bad-bit signal during each bit time when no valid bit has been decoded, and a first-carrier-selection circuit operative in response to both a carrier-detect signal and a corresponding synch-detect signal along with an absence of a bad-bit signal to cause a selection of the corresponding receiver as the one from which data is passed to the station data bus.

3. In a communications system having bidirectional loops making up redundant global data highways with corresponding redundant local highways connecting each of a plurality of stations thereto at nodes of the global highways, a modem providing an interface between a data bus of each station and said highways, comprising:

a transmitter operative to simultaneously transmit data from said station data buses to both of said highways in the form of frequency-shift-keyed signals coded to provide a prefix consisting of a predetermined number of pulses of a frequency which is a multiple or submultiple of a predetermined baseband frequency followed by a synch period of one bit time with no pulses which is in turn followed by data which in one state is at the baseband frequency and in the other state is at another frequency with the data being followed by a suffix having a fixed number of bit times without a valid data signal; and a separate receiver for each of said redundant highways, each of said receivers including;

a prefix counter operative to count said received signals during said initial period and to produce a carrier-detect signal indicative of receipt of a predetermined number of pulses at the prefix frequency, a synch-detecting circuit connected to receive said incoming signals and operative to produce a synch-detect signal when detecting a bit time without a valid data bit in the received signal, a first-carrier-selection circuit operative in response to both a carrier-detect signal and a corresponding synch-detect signal to cause a selection of the corresponding receiver as the one from which data is passed to the station data bus.

4. In a communications system having bidirectional loops making up redundant global data highways with corresponding redundant local highways connecting each of a plurality of stations thereto at nodes of the global highways, a modem providing an interface between a data bus of each station and said highways, comprising:

a transmitter operative to simultaneously transmit data from said station data buses to both of said highways in the form of frequency-shift-keyed signals coded to provide a prefix consisting of a predetermined number of pulses of a frequency which is a multiple or submultiple of a predetermined baseband frequency followed by a data which in one state is at the baseband frequency and in the other state is at another frequency with the data being followed by a suffix having a fixed number of bit times without a valid data signal; and a separate receiver for each of said redundant highways, each of said receivers including;

a modifying circuit connected to receive incoming signals and operative during the initial period of signal reception after the receiver circuits have been reset to a look-for-prefix mode to convert the received prefix signal to the baseband frequency, a decoding circuit selectively connected to the output of said modifying circuit during said initial period and connected to receive said incoming signals after said prefix is completed, said decoding circuit producing an output indicative of one state for the baseband frequency and the other state for the other frequency, a prefix counter operative to count said received signals during said initial period and to produce a carrier-detect signal indicative of receipt of a predetermined number of pulses at the prefix frequency, a first-carrier-selection circuit operative in response to both a carrier-detect signal and a corresponding synch-detect signal to cause a selection of the corresponding receiver as the one from which data is passed to the station data bus.

5. In a communications system having bidirectional loops making up redundant global data highways with corresponding redundant local highways connecting each of a plurality of stations thereto at nodes of the global highways, a modem providing an interface between a data bus of each station and said highways, comprising:

a transmitter operative to simultaneously transmit data from said station data buses to both of said highways in the form of frequency-shift-keyed signals coded to provide a prefix consisting of a predetermined number of pulses of a frequency which is a multiple or submultiple of a predetermined baseband frequency followed by data which in one state is at the baseband frequency and in the other state is at another frequency with the data being followed by a suffix having a fixed number of bit times without a valid data signal; and a separate receiver for each of said redundant highways, each of said receivers including;

a clock circuit synchronized with the data received for producing clock pulses to the circuits of said receiver, timer means responsive to said clock circuit for establishing a bit time period, a modifying circuit connected to receive incoming signals and operative during the initial period of signal reception after the receiver circuits have been reset to a look-for-prefix mode to convert the received prefix signal to the baseband frequency, a decoding circuit selectively connected to the output of said modifying circuit during said initial period and connected to receive said incoming signals after said prefix is completed, said decoding circuit producing an output indicative of one state for the baseband frequency and the other state for the other frequency, a prefix counter operative to count said received signals during said initial period and to produce a carrier-detect signal indicative of receipt of a predetermined number of pulses at the prefix frequency, a dead-line timing circuit operative to reset all receiver circuits to a look-for-prefix mode after a predetermined time period has elapsed with no carrier-detect signal or incoming data signal.

* * * * *